(12) United States Patent
Morse

(10) Patent No.: US 10,112,638 B2
(45) Date of Patent: Oct. 30, 2018

(54) SELF-ADJUSTING BALANCED MULTI-PURPOSE TRANSPORT CARRIER

(71) Applicant: Kendall A. Morse, Chicago, IL (US)

(72) Inventor: Kendall A. Morse, Chicago, IL (US)

( * ) Notice: Subject to any disclaimer, the term of this patent is extended or adjusted under 35 U.S.C. 154(b) by 0 days.

(21) Appl. No.: 14/617,851

(22) Filed: Feb. 9, 2015

(65) Prior Publication Data
US 2016/0229438 A1    Aug. 11, 2016

(51) Int. Cl.
B62B 5/06     (2006.01)
A45F 3/14     (2006.01)
B62B 5/04     (2006.01)
B62B 1/18     (2006.01)
B62B 1/26     (2006.01)

(52) U.S. Cl.
CPC ............... B62B 5/068 (2013.01); A45F 3/14 (2013.01); B62B 1/18 (2013.01); B62B 1/26 (2013.01); B62B 5/04 (2013.01); A45F 2003/142 (2013.01); A45F 2003/144 (2013.01); A45F 2003/146 (2013.01)

(58) Field of Classification Search
CPC ............... B62B 5/068; A45F 2003/146; A45F 2003/148
USPC ........................................................ 280/1.5
See application file for complete search history.

(56) References Cited

U.S. PATENT DOCUMENTS

| | | | | |
|---|---|---|---|---|
| 3,089,143 A * | 5/1963 | Jacobson | ........... | A62B 35/0006 116/28 R |
| 3,560,015 A * | 2/1971 | Tracy | ........... | B62B 1/12 224/153 |
| 4,534,619 A * | 8/1985 | Bedford | ........... | A41D 13/01 2/338 |
| 4,664,395 A * | 5/1987 | McCoy | ........... | A45C 13/385 224/153 |
| 4,838,565 A * | 6/1989 | Douglas | ........... | B62B 5/068 172/350 |
| 5,106,108 A * | 4/1992 | Howell | ........... | B62B 5/068 280/1.5 |
| 5,203,613 A * | 4/1993 | Ward | ........... | A47D 15/006 280/808 |
| 5,215,321 A | 6/1993 | Ljungberg | | |
| 5,385,355 A * | 1/1995 | Hoffman | ........... | B62D 51/04 280/1.5 |
| 5,769,431 A * | 6/1998 | Cordova | ........... | B62B 5/068 280/1.5 |
| 6,139,033 A * | 10/2000 | Western | ........... | B62B 1/02 280/1.5 |
| 6,431,556 B1 * | 8/2002 | Beardsley | ........... | B62B 5/068 224/184 |
| 7,175,188 B2 * | 2/2007 | Joncourt | ........... | A45F 3/04 280/47.17 |
| 7,422,223 B1 * | 9/2008 | Silliman | ........... | B62B 5/068 180/180 |
| 7,484,737 B2 * | 2/2009 | Satorius | ........... | A45F 3/14 280/1.5 |

(Continued)

Primary Examiner — Joseph M Rocca
Assistant Examiner — Michael R Stabley
(74) Attorney, Agent, or Firm — Geri N. Rochino

(57) ABSTRACT

Self-adjusting balanced multipurpose transport carriers and methods of using the same are provided. Aspects include a transport carrier for carrying a balanced load comprising a harness belt for attaching to a user, a mono-wheel, a platform, a stop plate, and a frame comprising first and second side rails and a pair of crisscross shoulder straps.

15 Claims, 9 Drawing Sheets

(56) References Cited

U.S. PATENT DOCUMENTS

| | | | | |
|---|---|---|---|---|
| 7,600,764 | B1* | 10/2009 | Parker | B62B 1/18 |
| | | | | 280/416 |
| 7,938,409 | B2* | 5/2011 | Mejia | B62B 5/068 |
| | | | | 224/184 |
| 8,733,766 | B2* | 5/2014 | Nieman | A45C 13/385 |
| | | | | 280/30 |
| 8,789,730 | B2* | 7/2014 | Mroczka | A45F 3/04 |
| | | | | 224/156 |
| 9,084,470 | B1* | 7/2015 | Huck | A45F 3/14 |
| 2004/0150175 | A1* | 8/2004 | Cepull | B62B 19/02 |
| | | | | 280/47.24 |
| 2006/0048723 | A1* | 3/2006 | Rohlf | A62B 35/04 |
| | | | | 119/857 |
| 2008/0174078 | A1* | 7/2008 | Dooley | A45F 3/08 |
| | | | | 280/1.5 |
| 2014/0203529 | A1* | 7/2014 | Ortega | B62B 1/10 |
| | | | | 280/47.25 |

* cited by examiner

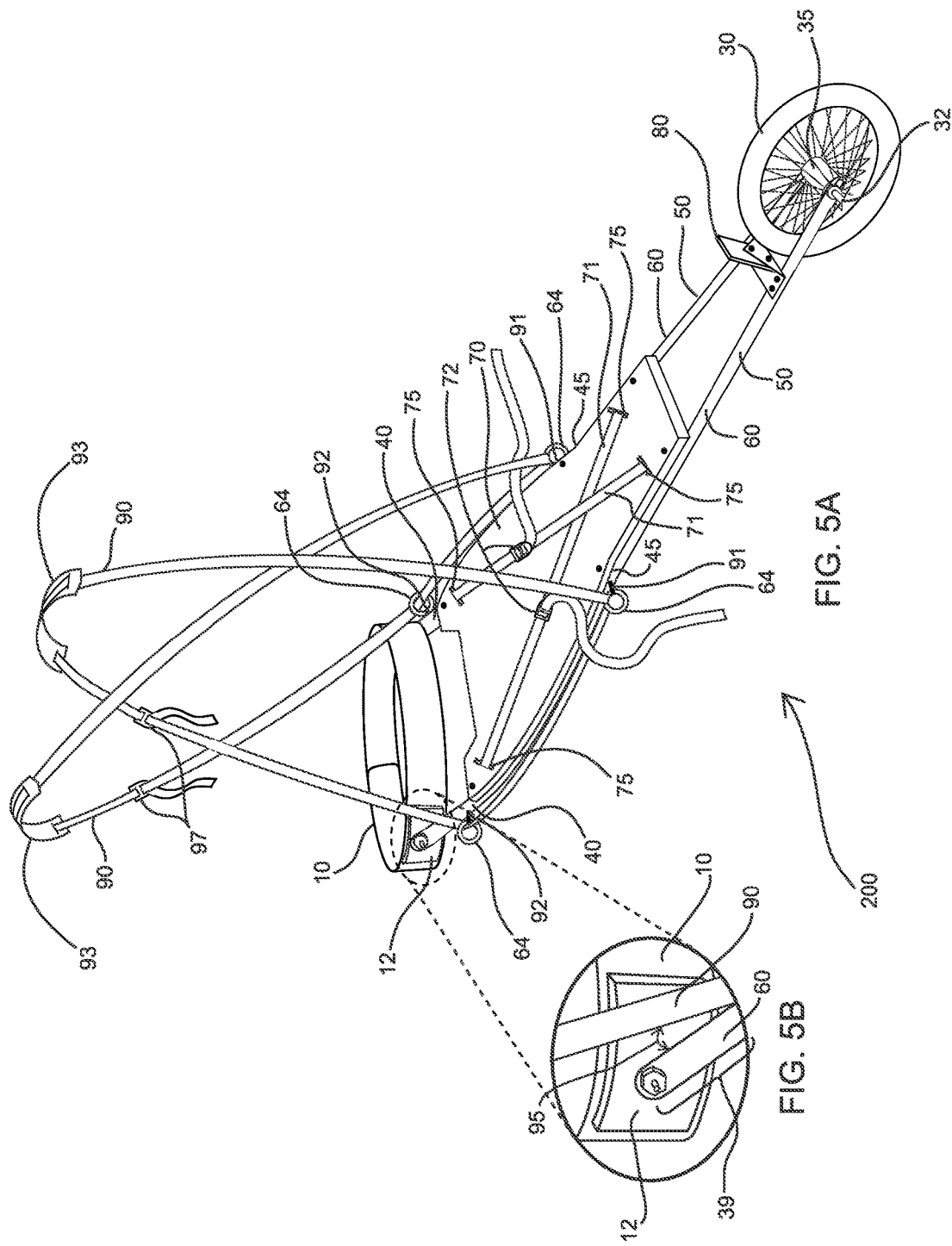

SELF-ADJUSTING BALANCED MULTI-PURPOSE TRANSPORT CARRIER

TECHNICAL FIELD OF THE INVENTION

The field of this invention relates to mono-wheeled, multi-purpose transport carriers for towing loads.

BACKGROUND OF THE INVENTION

Throughout history, people have been trying to find new ways to transport heavy loads across varying terrains and/or great distances. There is a long line of wheeled carriers that have been previously invented to assist people with transport such as, for example, a dolly, cart, sled, and wheel barrow. There have also been several carriers that require a person to tow or carry a load behind them. However, these carriers are typically meant to transport a load over short distances and are not meant to go over rough terrain without a human or animal bearing a large part of the load burden.

None of these items would be particularly helpful to a person wishing to backpack or camp in an area that requires hiking a great distance over rough terrain. The average backpacker carries a load ranging from 25-50 lbs. of mostly and typically essential items such as the backpack itself, a sleeping bag, tent, clothes, camp stove, utensils, food, and water. Commonly, a backpacker would carry these items over several miles, often times requiring a hike up very steep areas over a variety of terrains such as rocky, grassy, dirt, brushy, and often uneven areas with dips, holes and crevices. Depending on the individual, the load weight does not go much higher than 50 lbs. as this would create a lot of stress on the user and it would be difficult to travel with it over much distance in a reasonable length of time.

Primary issues that can prevent prior inventions from being able to carry loads over these terrains are a lack of maneuverability and balance. If the carrier has two wheels, it is not only heavier than a single wheel carrier but it is also very difficult to maneuver over a rough terrain that may be narrow or curving. Having a single wheel makes moving and maneuvering much easier. A single wheel permits running a load along a path that is barely wide enough to stand on, whereas two wheels require a wider path with a level terrain to keep the load from tipping.

There are single wheel carriers that may carry a load for a short distance, but these carriers have balancing issues, particularly when the load is greater than 20 lbs. The heavier the load, the more unbalanced it can tend to become. The more unbalanced it is, the more the load burden gets distributed from the carrier and onto the body of the user via the harness attaching the carrier to the body. This undesirable load redistribution puts strain on the overall body of the user, particularly the legs, making it more difficult to go further distances or transport the average, substantial weight of essentials required for overnight backpacking trips. Patent descriptions of prior inventions in the field of single-wheel personal towing devices generally do not provide clear, detailed specifics on how the device has solved the problem of maintaining hands-free balance when the device is being towed under heavy loads, particularly over rough, rutted, rocky ground that goes uphill or downhill.

For example, U.S. Pat. No. 7,484,737 ('737) is directed to a mono-wheel device which is capable of switching from a towing device to a backpack. The '737 device has two separate structures, described as a linkage and a frame. A user relies on a harness belt to tow a load and the back pack straps are only utilized when the user wishes to no longer tow the load but instead carry the load on the user's back. The back pack configuration is essentially a back pack having parallel straps and does not add any benefit when a load is being towed. The '737 patent does not describe a balancing mechanism that enables balance and/or stability when the carrier is under tow with a substantial weight. The '737 device also includes an embodiment having two wheels which would overcome the balancing problem inherent with a mono-wheel device but as noted above, the second wheel also adds additional weight and a lack of maneuverability.

Another prior example includes U.S. Pat. No. 5,385,355 ('355) which describes another mono-wheel device in which the towing part is attached to an apparatus having an external backpack frame with a standard backpack configuration in which the straps are parallel when worn by a user. With this device, the backpack harness attaches to a complicated single-point hitching mechanism which is asserted to assist the device with maneuverability. If the load were to roll and become unbalanced, the force of the weight shift would be transmitted directly to the user harness and would be tantamount to the loss of balance of a normal, heavily loaded backpack, which would tend a) to throw the user off balance or b) to twist the harness on the user's back and thus potentially cause the device to roll to the ground.

Accordingly, there is interest in a transport carrier that is capable of sustaining a balanced load with its weight resting primarily on the wheel to reduce the load burden on the user while at the same time providing maneuverability when traveling distances, in particular over varying rough terrains. In general contrast to patent descriptions of prior inventions in the field of mono-wheeled, multi-purpose transport carriers for towing loads, the present application provides clear, detailed descriptions of a unique balancing mechanism by which the present invention specifically solves the problem of maintaining hands-free balance when the mono-wheeled carrier is being towed under heavy loads, particularly over rough, rutted, rocky ground that goes uphill or downhill.

SUMMARY OF THE INVENTION

Self-adjusting balanced multipurpose transport carriers and methods of using the same are provided. Aspects include a transport carrier for carrying a balanced load comprising a harness belt for attaching to a user, a mono-wheel, a platform, a stop plate, and a frame comprising a first and a second side rail, wherein the first and second side rails are positioned parallel to each other and span the length of the carrier and comprises a front end, a rear end and a midpoint. The transport carrier further comprises a pair of crisscross shoulder straps. In some embodiments, the crisscross shoulder straps comprises a first strap attached to the first side rail at a first point of attachment located at the front end of the first side rail and wherein the first strap is attached to the first side rail at a second point of attachment located between the front end and the midpoint of the first side rail. The crisscross shoulder straps further comprises a second strap attached to the second side rail at a first point of attachment located at the front end of the second side rail and wherein the second strap is attached to the second side rail at a second point of attachment located between the front end and the midpoint of the second side rail. In other embodiments, the carrier comprises a pair of crisscross shoulder straps comprising a first strap attached to the first side rail at a single point of attachment located at the front end of a first side rail and a second strap attached to the second side rail at a single point of attachment located at the front end of a second side rail. In certain aspects of the invention, the first strap and first side rail are configured to form an angle between the first strap and the front portion of the first side rail and wherein the second strap and second side rail are configured to form an angle between the second strap and the front portion of the second side rail, when a user is wearing the crisscross shoulder straps and standing still and not towing the load and wherein the angle is sufficient to allow the crisscross shoulder straps to adjust and balance a load. In other aspects, the shoulder straps and front portions of the side rails form angles that range from about 10° to about 90° between the strap and the front portion of the side rail when a user is wearing the shoulder straps and standing still and not towing the load.

BRIEF DESCRIPTION OF THE FIGURES

The figures shown herein are not necessarily drawn to scale, with some components and features being exaggerated for clarity.

FIG. 5A illustrates an embodiment of a self-adjusting balanced multipurpose transport carrier and FIG. 5B illustrates a detail of the angle created by the side rail and harness belt according to the present invention.

DETAILED DESCRIPTION OF THE EMBODIMENTS

Figure 1:
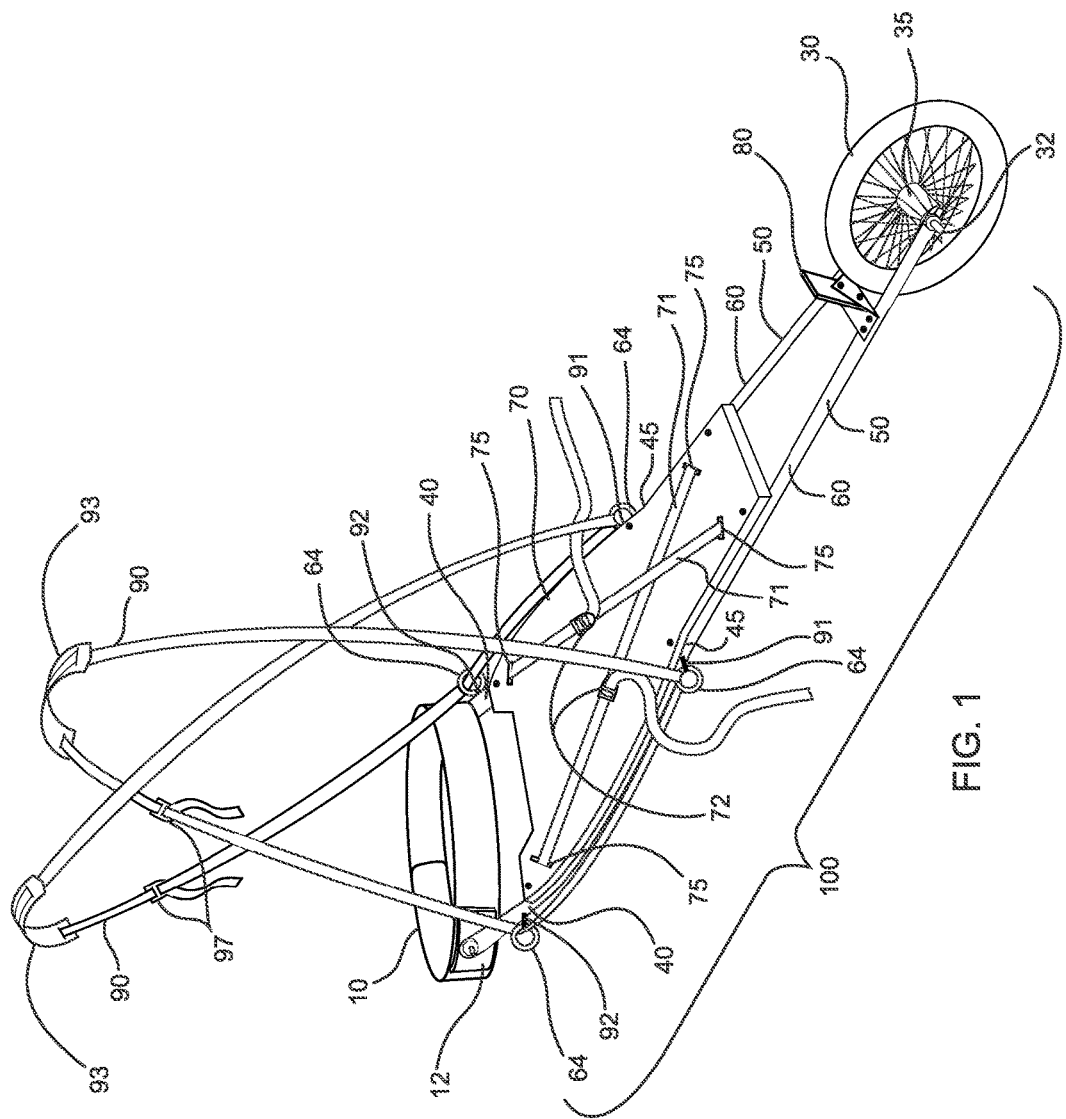
FIG. 1 illustrates an embodiment of a self-adjusting balanced multipurpose transport carrier according to the present invention.

Self-adjusting balanced multipurpose transport carriers and methods of using the same are provided. Aspects include a transport carrier for carrying a balanced load comprising a harness belt for attaching to a user, a mono-wheel, a platform, a stop plate, and a frame comprising a first and a second side rail, wherein the first and second side rails are positioned parallel to each other and span the length of the carrier and comprises a front end, a rear end and a midpoint. The transport carrier further comprises a pair of crisscross shoulder straps. In some embodiments, the crisscross shoulder straps comprises a first strap attached to the first side rail at a first point of attachment located at the front end of the first side rail and wherein the first strap is attached to the first side rail at a second point of attachment located between the front end and the midpoint of the first side rail. The crisscross shoulder straps further comprises a second strap attached to the second side rail at a first point of attachment located at the front end of the second side rail and wherein the second strap is attached to the second side rail at a second point of attachment located between the front end and the midpoint of the second side rail. In other embodiments, the carrier comprises a pair of crisscross shoulder straps comprising a first strap attached to the first side rail at a single point of attachment located at the front end of a first side rail and a second strap attached to the second side rail at a single point of attachment located at the front end of a second side rail. In certain aspects of the invention, the first strap and first side rail are configured to form an angle between the first strap and the front portion of the first side rail and wherein the second strap and second side rail are configured to form an angle between the second strap and the front portion of the second side rail, when a user is wearing the crisscross shoulder straps and standing still and not towing the load and wherein the angle is sufficient to allow the crisscross shoulder straps to adjust and balance a load. In other aspects, the shoulder straps and front portion of the side rails form angles that range from about 10° to about 90° between the strap and the front portion of the side rail when a user is wearing the shoulder straps and standing still and not towing the load.

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Methods recited herein may be carried out in any order of the recited events which is logically possible, as well as the recited order of events.

Unless defined otherwise, all technical and scientific terms used herein have the same meaning as commonly understood by one of ordinary skill in the art to which this invention belongs. Although any methods and/or materials similar or equivalent to those described herein can also be used in the practice or testing of the present invention, the preferred methods and materials are now described.

All publications mentioned herein are incorporated herein by reference to disclose and describe the methods and/or to which the cited publications are connected.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The embodiment provided in FIG. 1 is a mono-wheeled carrier 200 which generally comprises a harness belt 10 for attaching to a user comprising a pair of hitch mechanisms 12, a mono-wheel 30, a pair of crisscross shoulder straps 90, and a frame 100, wherein the frame 100 comprises a pair of side rails 60 which are lateral to each other and span the length of the frame 100 and includes a front end 40, a midpoint 45, and a rear end 50. By "front end" is meant an area of the side rail starting at the end of the side rail where it attaches to the harness belt to the midpoint of the side rail. By "midpoint" is meant the area at the center of each side rail centrally positioned between each of the ends of the side rail. By "rear end" is meant an area of the side rail starting at the midpoint to the end of the side rail that attaches to the mono-wheel 30.

Frame 100 generally comprises side rails 60 that run laterally to each other, platform 70 crossing side rails 60 and attaching to and firmly connecting them at the front end of, midpoint of, and two-thirds down side rails 60, and stop plate 80 crossing side rails 60 near the rear end. In certain aspects of the invention, platform 70 and stop plate 80 serve as crossing members that cross, attach to and firmly connect the side rails and are constructed of rigid materials apparent to one of ordinary skill in the art, for example rigid plywood (e.g., about ⅜" to about ½") for platform 70 and a rigid steel base and about ¼" plywood vertical member for stop plate 80. These crossing structures give the frame rigidity, which helps to prevent side rails 60 from warping and twisting and thus losing balance when the carrier is in use under a substantial load.

Figure 2A:
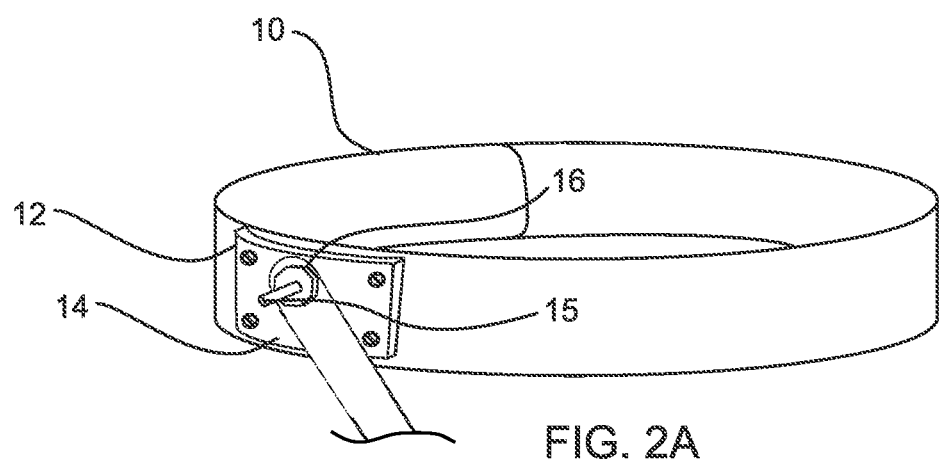
FIGS. 2A and 2B illustrate a front (2A) and side (2B) perspective of an exemplary harness belt of a self-adjusting balanced multipurpose transport carrier according to the present invention.
Figure 2B:
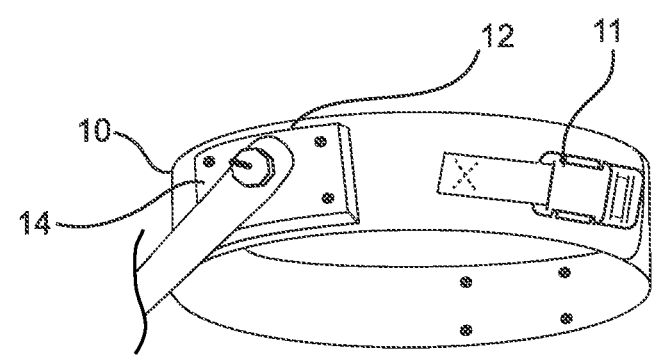

The front end 40 of each side rail 60 is pivotally connected to the hitch mechanism 12 of harness belt 10. The first hitch mechanism 12 is located on the left side and an identical hitch mechanism 12 is located on the right side (not shown) of the harness belt 10 such that when a user is wearing the harness belt 10 each hitch mechanism 12 is in relative alignment with the right and left sides of the user's hip. As shown in more detail in FIG. 2A (a close up of harness belt 10) hitch mechanism 12 comprises a hitch base 14 and a hitch pivot 15 and is fastened to harness belt 10 at hitch base 14 with suitable fasteners such as relatively small nuts and bolts. Hitch base 14 is generally a curved rectangular-shaped section of rigid material having hitch pivot 15 protruding from it. The material of base 14 would be of sufficient strength for the application of supporting the lighter, front end of carrier 200 and could be constructed of a sturdy material such as sheet metal, ABS or PVC plastic. Hitch pivot 15 is a shoulder bolt-type fastener having a smooth shank and a threaded end, although one of ordinary skill in the art will recognize that other fasteners may be used instead, for example, a round-head bolt would also work for a hitch pivot. The material used in the construction of pivot 15 would be a high-strength material such as corrosion resistant steel. As shown in FIG. 2B the front of harness belt 10 comprises a buckle 11 in front to secure harness belt 10 around a user. Harness belt 10 is of a sturdy, padded construction and buckle 11 is of the quick-release type to allow easy and quick removal of carrier 200 from user. Buckle 11 also has an adjustment feature such as a ladderlock to accommodate an adjustment pull-strap for adjusting the belt to users of different waist sizes.

As shown in FIG. 1, frame 100 connects directly at its front ends via side rails 60 to hitch mechanisms 12 and in certain embodiments; each of side rails 60 may be flattened perpendicularly at its front end and has a hole drilled out and is pivotally connected to hitch pivots 15 (FIG. 2A) on hitch mechanism 12. The flattened front ends of side rails 60 are connected to their respective pivots by means of a fastener 16 (FIG. 2A) such as a lock nut. Side rails 60 (running the full length of carrier 200) are elongated structures made of high-strength material such as aluminum tubing, galvanized steel conduit or custom-molded carbon fiber tubing. In certain embodiments, the side rails may be angled and curved at their front ends, for example, the side rails may be curved at their ends wherein the side rails attach to the hitch mechanism. These angled/curved sections facilitate mounting of frame to user harness belt at hitch mechanisms.

As shown in FIG. 1, the stop plate 80 is connected to side rails 60 in a position located close to or at the rear end 50 of the side rails 60. Frame 100 generally angles back triangularly from user harness belt 10 to an apex at mono-wheel 30 which is rotatably attached at the rear end 50 of side rails 60 past the stop plate so that the mono-wheel may rotate freely in a conventional manner using an axle in hub 35. In certain aspects, mono-wheel 30 is made of a bicycle wheel or alternative wheel known to those of ordinary skill in the art. In certain embodiments, the mono-wheel may have a diameter ranging from about 5 inches to about 25 inches, preferably about 6 inches to about 20 inches, more preferably about 10 inches to about 18 inches, and especially about 11 inches to about 14 inches, for example about 12.5 inches. Mono-wheel 30 and axle hub 35 slide into open-ended slots cut into the flattened ends of side rails 60 at axle bolt 32. Optional methods for securing mono-wheel 30 to the rear end of frame side rails 60 are known to one of ordinary skill in the art and may, for example include holes drilled into the flattened ends of side rails and conventional axle lock nuts or quick-release axle nuts.

As shown in FIG. 1, the carrier 200 further comprises a pair of crisscross shoulder straps 90. The crisscross shoulder straps 90 comprises a first strap attached to a first side rail 60 at a first point of attachment 92 and at a second point of attachment to the same first side rail 60 at 91. The first point of attachment 92 for the first strap 90 is located at a point on the first side rail near the front end 40 of the first side rail 60 and the second point of attachment 91 for the first strap 90 is located at a point on the first side rail in an area between the midpoint 45 and front end 40 of the first side rail 60. The second crisscross shoulder strap 90 is attached to the second side rail 60 in the same configuration such that the second strap is attached to the second side rail 60 at a first point of attachment 92 located at a point on the second side rail near the front end 40 of the second side rail and at a second point of attachment to the same second side rail 60 at 91 located at a point on the second side rail in an area between the midpoint 45 and front end 40 of the second side rail 60.

Figure 3:
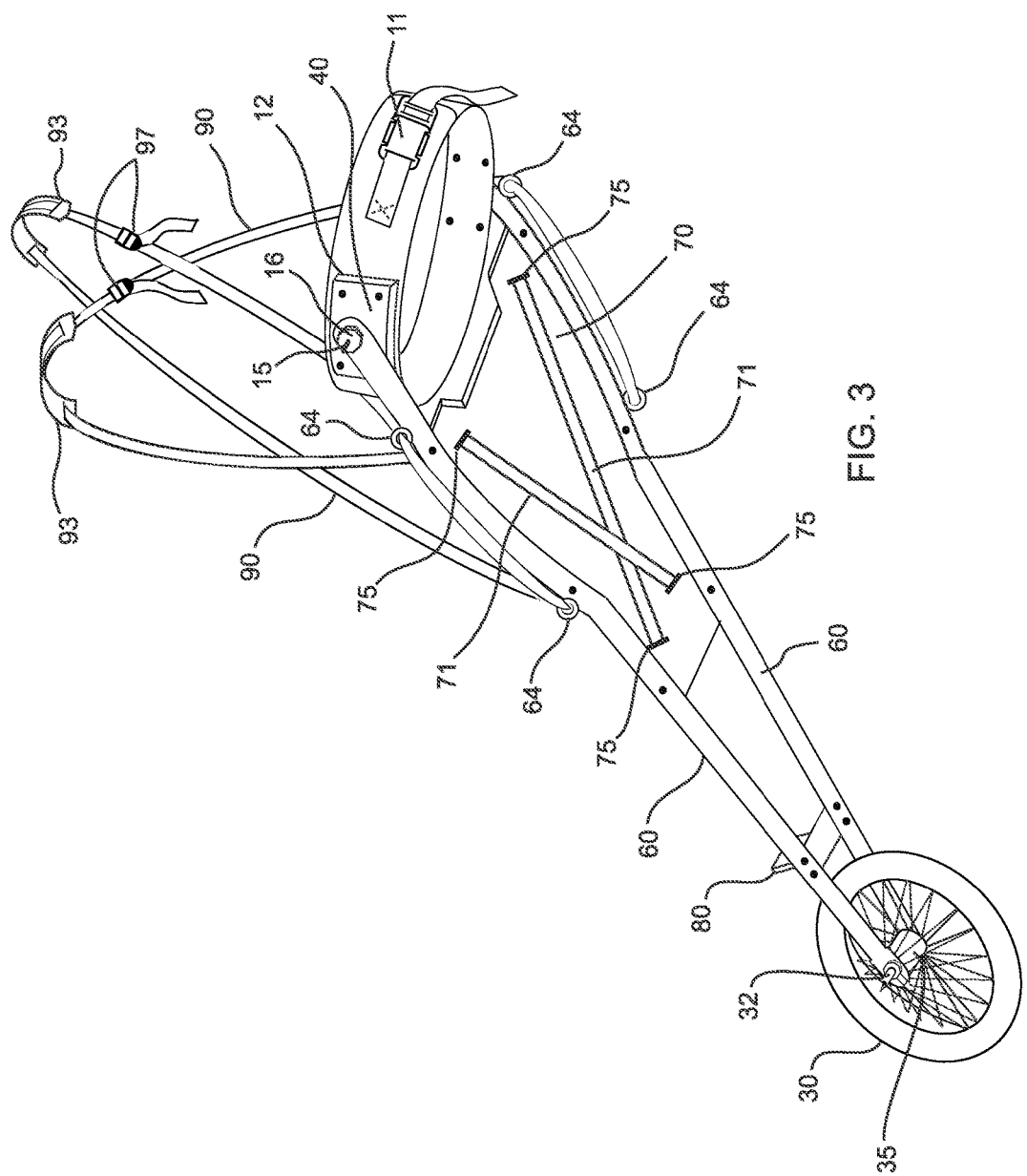
FIG. 3 illustrates the underside of an embodiment of a self-adjusting balanced multipurpose transport carrier according to the present invention.

In certain aspects, the transport carrier may further include first and second load-securing straps 71 for securing a load firmly to platform 70 and include strap adjustment buckles 72 which may be ladderlock buckles and ample pull-strap extensions, as shown in FIG. 1, allowing adjustment to various size loads such as a backpack. Load-securing straps 71 are attached to platform 70 by means known to one of ordinary skill in the art, and for example, may pass through short slots cut into platform 70 near the four corners 75 as in FIG. 1. Each pair of diagonally opposite slots is cut at an appropriate angle such that the pair mates are parallel to or facing each other. Each of straps 71 is a continuous loop, one crossing the other above platform 70 as in FIG. 1 and below platform 70 as in FIG. 3. Even when tightly secured with load-securing straps 71, a heavy, juddering load has the potential to sag rearward somewhat, in which case stop plate 80 prevents the load from slipping down and coming in contact with mono-wheel 30. Although not shown, additional load-securing straps with adjustment buckles and pull-strap extensions can be run laterally across the top of the load and under side rails and platform to further secure loads of varying sizes and shapes if needed. Other load-securing options could include resilient web or open mesh fabric such as nylon that is attached to and spans platform. Another embodiment comprises a lockable, rigid case that attaches securely to the top of platform and is similar to top cases that attach securely to the back of a motorcycle behind the rider.

Figure 4:
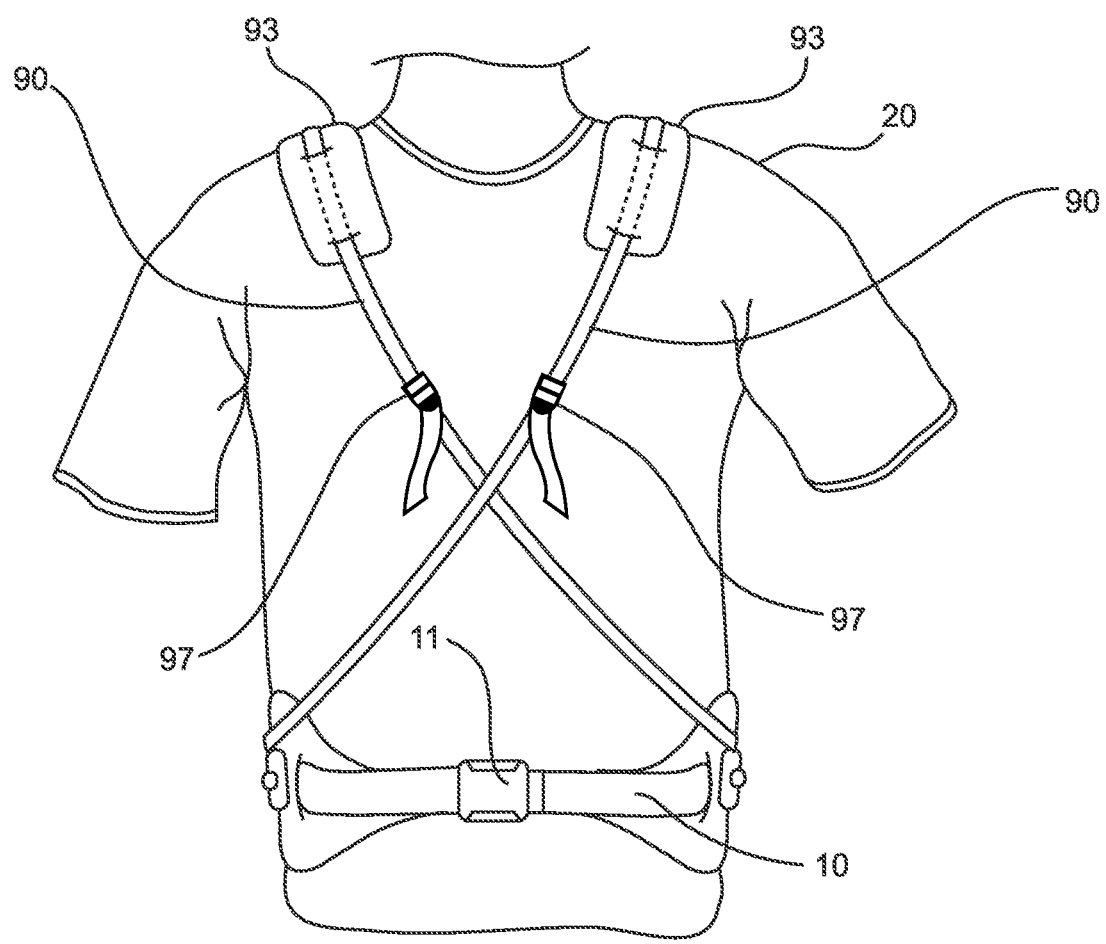
FIG. 4 illustrates a frontal perspective of a user wearing exemplary crisscross shoulder straps and harness belt of a self-adjusting balanced multipurpose transport carrier according to the present invention.

As shown in FIGS. 1 and 4, crisscross shoulder straps 90 further comprises shoulder pads 93 and adjustment buckles 97 such as ladderlock buckles and pull-strap extensions. The shoulder straps 90 are directly attached to side rails 60 by attachment mechanism known to one of ordinary skill in the art. In the embodiment shown in FIG. 1, each of shoulder straps 90 is a continuous loop that connects to side rails 60, respectively, by passing through two well-spaced anchors 64 on each side rail 60 such as eye hooks or steel rings fixed to the rails with zip ties. Well-spaced anchors 64 provide ample counter-balance lift points of straps 90, respectively, along the length of side rails 60.

When in use, each crisscross shoulder strap passes over the user's head such that its shoulder pad is resting on the shoulder opposite of the side where the strap is attached to the side rail as shown on the front torso of user in FIG. 4. For example, user would put the shoulder strap 90 attached to the left side rail over the user's 20 head so that this strap's shoulder pad 93 rests on user's right shoulder when facing forward from the front end of the towing device. In turn, user would take the shoulder strap 90 attached to the right side rail and pull it over the user's 20 head so that the shoulder pad 90 of this strap rests on the user's left shoulder. This cross pattern plus well-spaced anchors 64 (FIG. 1) assure the ability of shoulder straps 90 to balance carrier 200 either at rest or in tow. The balanced load on carrier 200 is further facilitated by the rigid construction of platform 70 and the snug application of load-securing straps 71 on a well-positioned load whose weight is evenly distributed from side to side and as far rearward and low as possible on platform 70. Given these load-balancing characteristics, carrier 200 crisscross shoulder straps 90 efficiently balance the heavily loaded carrier with only light, fully comfortable pressure on the shoulders that does not discomfort or weigh down the user.

As shown in the embodiment in FIGS. 5A and 5B, the first shoulder strap 90 and the front end portion 39 of the first side rail are configured such that they each form a side of an angle 95 in which the vertex of the angle is the first, forward point of attachment on the side rail when a user is wearing the shoulder straps in a crisscross manner and standing still and not towing the load. FIG. 5B shows in more detail the configuration of strap 90 and front end portion 39 of side rail 60 to form the sides of an angle 95 between the strap itself 90 and the front end portion 39 of side rail 60. Although not shown in FIGS. 5A and 5B, the second shoulder strap 90 and the front end portion 39 of the second side rail are also configured such that they each form a side of an angle 95 in which the vertex of the angle is the first, forward point of attachment for the side rail when a user is wearing the shoulder strap in a crisscross manner. By "front end portion" of the first and second side rail is meant the portion of the side rail 39 starting at the first point of attachment where the shoulder strap attaches to the rail to the front end of the side rail where each side rail attaches to each hitch mechanism 12 of harness belt 10.

In certain aspects, the size of angle 95 is sufficient to allow the straps to exert a pulling force on the side rail to allow the carrier to self-adjust any balancing issues that occur when the user is towing the load. In certain aspects, the angle may range from about 10° to about 90°, such as for example from about 30° to about 60°, such as for example from about 15° to about 30°. In a specific embodiment, the angle ranges from about 10° to about 25°. Those with ordinary skill in the art will recognize that this angle could range up to 90° as the front attachment point moves ever farther forward and even potentially onto an extension that could be added to the front end of the side rail. The effective angle could decrease also, perhaps to as small as 10°, as the front attachment point is moved farther back along the side rail.

The crisscross shoulder straps described herein are more efficient than regular backpack shoulder straps in balancing a heavily loaded carrier. When a load is present on the platform of an embodiment of the invention, and the carrier is in use, any normal, variable motions of walking and towing and the load itself will tend to throw the carrier off balance, whether on flat, smooth ground (less so) or on tilting, rough ground (more so). If the heavily loaded carrier loses balance and begins to roll left or right, the weight comes off the mono-wheel and shifts to a position suspended above the ground, thus exerting a large force on the points where the frame attaches to the user harness belt. The crisscross shoulder straps of the present carrier are designed to prevent such losses of balance.

When a carrier should begin to lose balance significantly, the crisscross shoulder straps of the present invention are able to catch the shift in weight well before it reaches a critical stage of unbalance. In addition, in certain aspects, a feature of the crisscross shoulder straps is that a user may tighten the shoulder strap or move his/her shoulder opposite to the direction of roll, for example slightly tightening the left strap or moving the left shoulder in the case of a right-rolling load, quickly and easily rights the carrier without affecting the balance of the user. In the case of a user harness employing a backpack external frame, the force of the weight shift would be tantamount to the loss of balance of a normal, heavily loaded backpack, which would tend a) to throw the user off balance or b) to twist the harness on the user's back, thus potentially allowing the carrier to hang heavily from the attachment points on the user harness or even to roll to the ground. The efficiency of the crisscross shoulder straps may be illustrated by a user towing a load while accompanied by a second person walking close behind. If the heavily loaded carrier starts to roll left or right, the second person can quickly move up to the falling side and easily right the carrier by lifting up on the rail with a hand. By providing direct contact between the user's shoulders and the opposite side rails of the carrier, the present invention's shoulder straps replace the second user in creating a rebalancing lift. In sum, the present invention's shoulder straps are designed to provide balance to the carrier, whereas regular backpack shoulder straps are designed to carry backpack weight and to position a pack on a hiker's back, not to balance a mono-wheeled carrier.

In certain aspects, each crisscross shoulder strap is anchored at two strategically spaced points and directly on to each side rail. This creates a stabilizing triangle formed base consisting of the front of a shoulder strap at the first point of attachment and the back of a shoulder strap at the second point of attachment wherein the apex of the stabilizing triangle formed base is at the user's shoulder. The crisscross shoulder straps and stabilizing triangle formed base create a lifting force that emanates from the apex at the shoulder and pulls up on the base via the front and back straps which helps to increase the beneficial force of the straps on the side rail and thus gives the side rail extra leverage as the triangle formed base pulls up on it to bring the load back up to its center of balance.

Figures 6A, 6B:
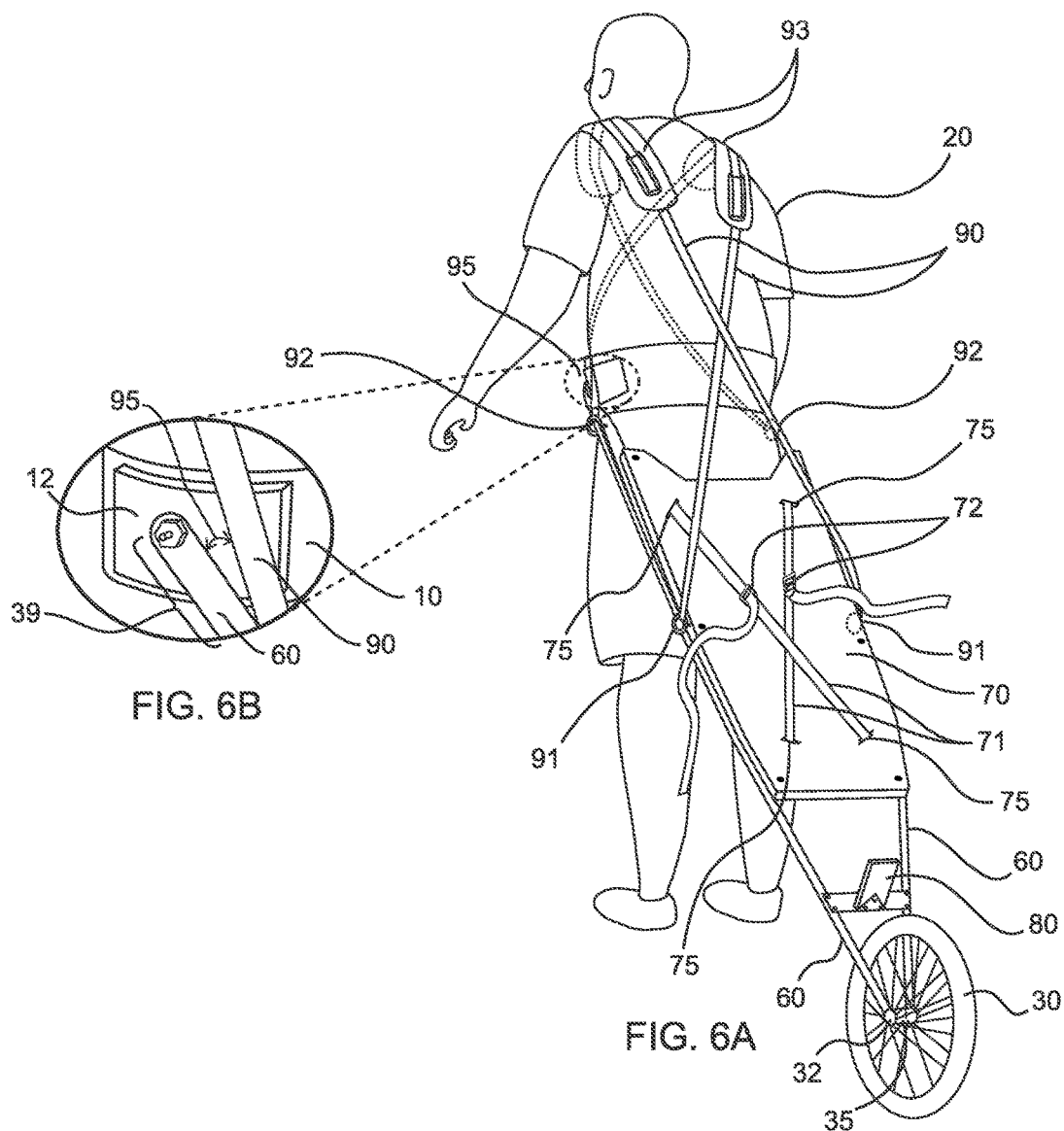
FIG. 6A illustrates a user wearing an embodiment of a self-adjusting balanced multipurpose transport carrier and FIG. 6B illustrates a detail of the angle created by the side rail and harness belt according to the present invention.
Figures 7A, 7B:
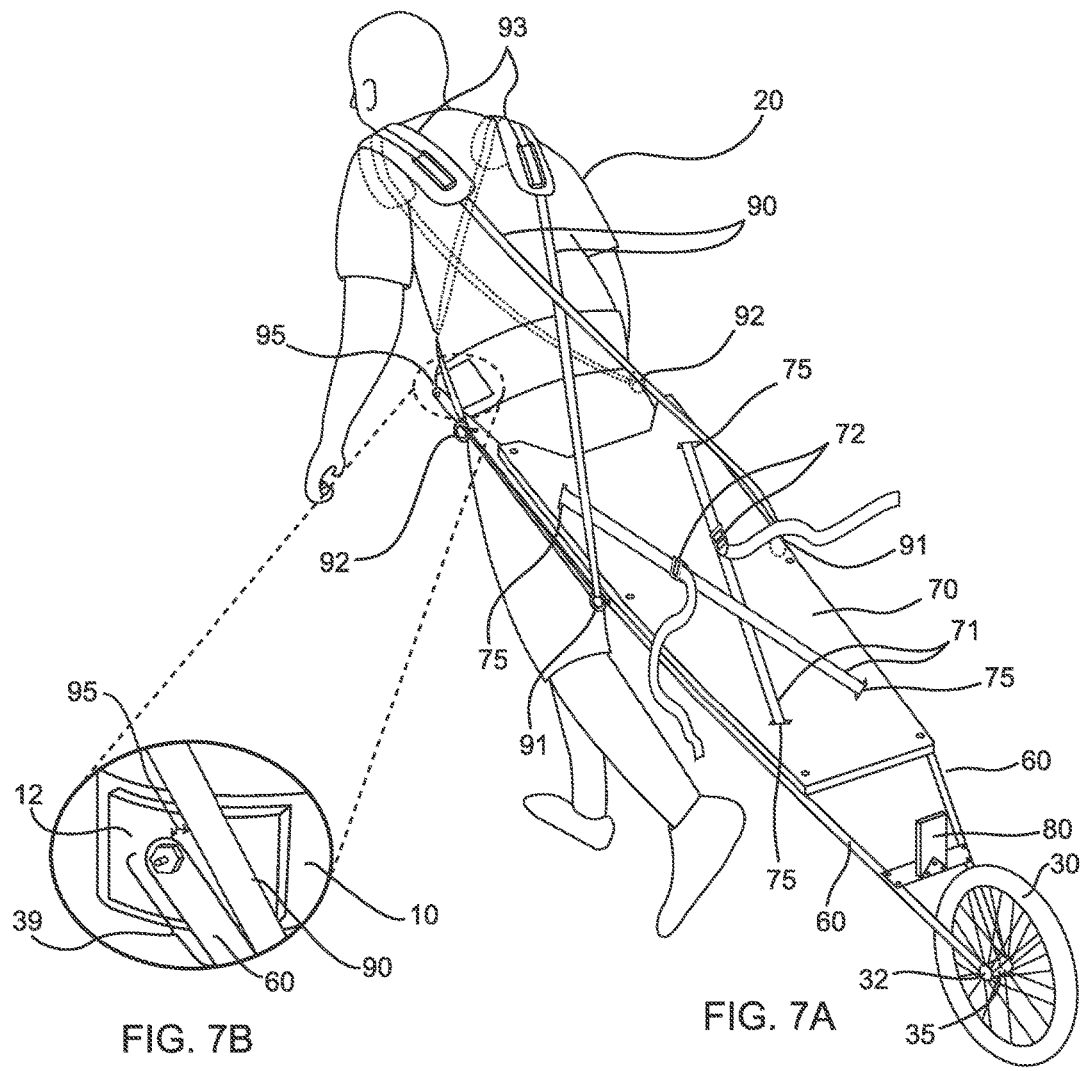
FIG. 7A illustrates a user wearing an embodiment of a self-adjusting balanced multipurpose transport carrier and FIG. 7B illustrates a detail of the angle created by the side rail and harness belt according to the present invention.

As shown in FIGS. 6A and 6B, the angle 95 occurs when the user 20 is standing still and not towing the load. This resting angle decreases when the user 20 is moving and leaning forward in the natural attitude to tow a loaded carrier as shown in FIGS. 7A and 7B. Therefore, the resting angle is sufficiently large to allow the angle to decrease under movement but still be ample for exerting effective lift on the side rail and thus allow the crisscross shoulder straps to self-adjust and maintain a balanced load when the user is towing the load.

A feature of this invention is that the first and second shoulder straps may attach to the first and second side rails, respectively, at first and second attachment points that vary along the front end of the side rails. In certain aspects, the position of the first point of attachment for the first and second shoulder straps to the front end of the frame varies between users of different sizes, height, and/or proportion. In certain embodiments, the position of the first point of attachment for the first and second shoulder straps may be very close to the front end of the first and second side rail, respectively. For example, the first points of attachment for the first and second side rails may be located at the front end portion of the side rail and in other embodiments, located adjacent to the point where the harness belt is attached to side rails. In certain aspects, the position of the second attachment point for the first and second shoulder strap may be located close to the front end of each first and second side rail, respectively. For example, the second points of attachment for the first and second side rails may be located at the front end portion of the side rail and in other embodiments, located adjacent to the first point of attachment for the first and second side rails. The specific location of the first and second points of attachment may vary so long as the strap and front end portion of side rail are configured to form the sides of an angle between the strap itself and the front end portion of side rail. In certain aspects, the size of angle is sufficient to allow the straps to exert a pulling force on the side rail to allow the carrier to self-adjust any balancing issues that occur when the user is towing the load. In certain aspects, the angle may range from about 10° to about 90°, such as for example from about 30° to about 60°, such as for example from about 15° to about 30°. In a specific embodiment, the angle ranges from about 10° to about 25°.

In other embodiments, the carrier comprises a pair of crisscross shoulder straps 90 (FIG. 8) comprising a first strap attached to the first side rail 60 at a single point of attachment 92 located at the front end area 40 of a first side rail 60 and a second strap attached to the second side rail at a single point of attachment 92 located at the front end area of a second side rail. In certain aspects, this single point may be located close to the front end of each first and second side rail 60, respectively. For example, the single point of attachments for the first and second side rails 60 may be located at the front end portion of the side rail and in other embodiments, located adjacent to the point where the harness belt is attached to side rails 60. The specific location of the single point of attachment may vary so long as the strap 90 and front end portion of side rail 60 are configured to form the sides of an angle 95 between the strap itself and the front end portion of side rail 60. In certain aspects, the size of angle 95 is sufficient to allow the straps to exert a pulling force on the side rail to allow the carrier to self-adjust any balancing issues that occur when the user is towing the load. In certain aspects, the angle may range from about 10° to about 90°, such as for example from about 30° to about 60°, such as for example from about 15° to about 30°. In a specific embodiment, the angle ranges from about 10° to about 25°.

The efficiency of the crisscross shoulder straps for self-adjustment in balancing a heavy load or for relatively minor manipulation by user in balancing a heavy load is provided by two key features: a) the angle formed at each attachment point (or single attachment point) between the strap and the forward-going section of rail and b) the position of the attachment points (or single attachment point) for each strap on the side rail. First, the angle of attachment must be in the range of about 10° to about 90°, such as for example from about 30° to about 60°, such as for example from about 15° to about 30°. In a specific embodiment, the angle ranges from about 10° to about 25° to be sufficient to provide lift on the rail in the direction opposite to the roll of the unbalanced load. If this angle is too small, then the force exerted on that attachment point is forward and is not lateral and opposite to the tipping weight. In other words, with too small an angle, the strap tries to pull the carrier into the user, which has little or no beneficial effect on the rolling weight.

The greater the angle, the closer the strap is at each attachment point to being able to pull straight up and across the carrier, thus causing an off-balance load to pivot on the mono-wheel and back to its center of balance. Second, more forward positions for the strap attachment points are more efficient for balancing the load than are more rearward positions. For one thing, a forward attachment position facilitates achieving the just-discussed, critical angle ranging from about 10° to about 90°, such as for example from about 30° to about 60°, such as for example from about 15° to about 30°. In a specific embodiment, the angle ranges from about 10° to about 25° between the strap and forward section of side rail. For another thing, straps pulling on the side rail from forward positions exert greater leverage and thus greater force on the load itself because the carrier is loaded ideally with as much weight as possible as close to the rear and mono-wheel as possible. This problem is akin to applying a long or short pry bar, or lever, to the bottom of a heavy stone one is trying to move. The longer the pry bar, the easier the task of moving the stone. Analogously, applying balancing force close to the forward end of a side rail turns the rail into a longer lever; applying force to an attachment point that is down the side rail toward the rear of the carrier turns the side rail into a shorter lever. The longer side rail lever, which is a rail with a forward strap attachment point, greatly eases the task of counterbalancing a heavy load that is trying to roll to the side.

The more unbalanced a load, the more the load burden gets distributed from the carrier and onto the body of the user. This undesirable load redistribution puts strain on the overall body of the user, particularly the legs and shoulders, making it more difficult to transport a substantial load over a distance. The efficiency of the crisscross shoulder straps of the present invention for self-adjustment in balancing a heavy load and thus putting the load weight primarily on the mono-wheel to reduce the load burden on the user is a result of two key features: a) the angle formed at each attachment point between the strap and the forward-going section of rail and b) the position of the attachment points for each strap on the side rail. In certain aspects of the invention, the transport carrier reduces the load burden on a user by about 40% to about 90%, for example by 40%, for example by 50%, for example by 60%, for example by 70%, for example by 80%, for example by 90%. In some embodiments, a user may add a load to the carrier that ranges in certain embodiments from about 20 lbs. to about 50 lbs. or more, in other embodiments ranges from about 30 lbs. to about 70 lbs or more, in other embodiments ranges from about 45 lbs. to about 90 lbs. or more, and in other embodiments ranges from about 60 lbs. to about 120 lbs. or more, in other embodiments ranges from about 80 lbs. to about 150 lbs., and in other embodiments ranges from about 120 lbs. to about 200 lbs.

In another embodiment, side rails may include different holes along the length of the side rail so that the shoulder strap's point of attachment to the side rail may be adjusted simply by moving the attachment ring to a different hole on the side rail. In certain embodiments, the attachment rings can be easily moved from one hole to another in the side rail such as by use of a zip tie inserted through the hole and looped through a ring such as but not exclusively a metal o-ring, or by use of an eye bolt fastened with a wing nut, or by use of a stainless steel quick-release ¼-inch clevis pin equipped with a toggle end, spring tensioner, and a key-ring that functions as the attachment ring or, as one of ordinary skill in the art will recognize, by use of several other convenient fastening systems. In certain aspects, a user would be able to adjust the position of attachment for the first and second shoulder straps to the front end of frame closer to the midpoint or closer to the front end of frame in order to maintain angle in a range from about 10° to about 90°, such as for example from about 30° to about 60°, such as for example from about 15° to about 30°. In a specific embodiment, the angle ranges from about 10° to about 25° when the user is not moving and not towing the load.

In another embodiment, side rails may have several alternate attachment holes at the flattened front ends to accept hitch pivots and may have extended slots with various attachment points or multiple alternate attachment holes at the flattened rear ends to accept wheel axle bolts. The benefits of these multiple attachment points would be to adjust the length of the carrier to various stride lengths of users, thus allowing taller users to avoid kicking the mono-wheel with the heels of shoes or boots when towing carrier. In certain aspects, side rails are made of high-strength aluminum tubing, galvanized steel conduit or bicycle-frame tubing such as carbon fiber.

Figure 9:
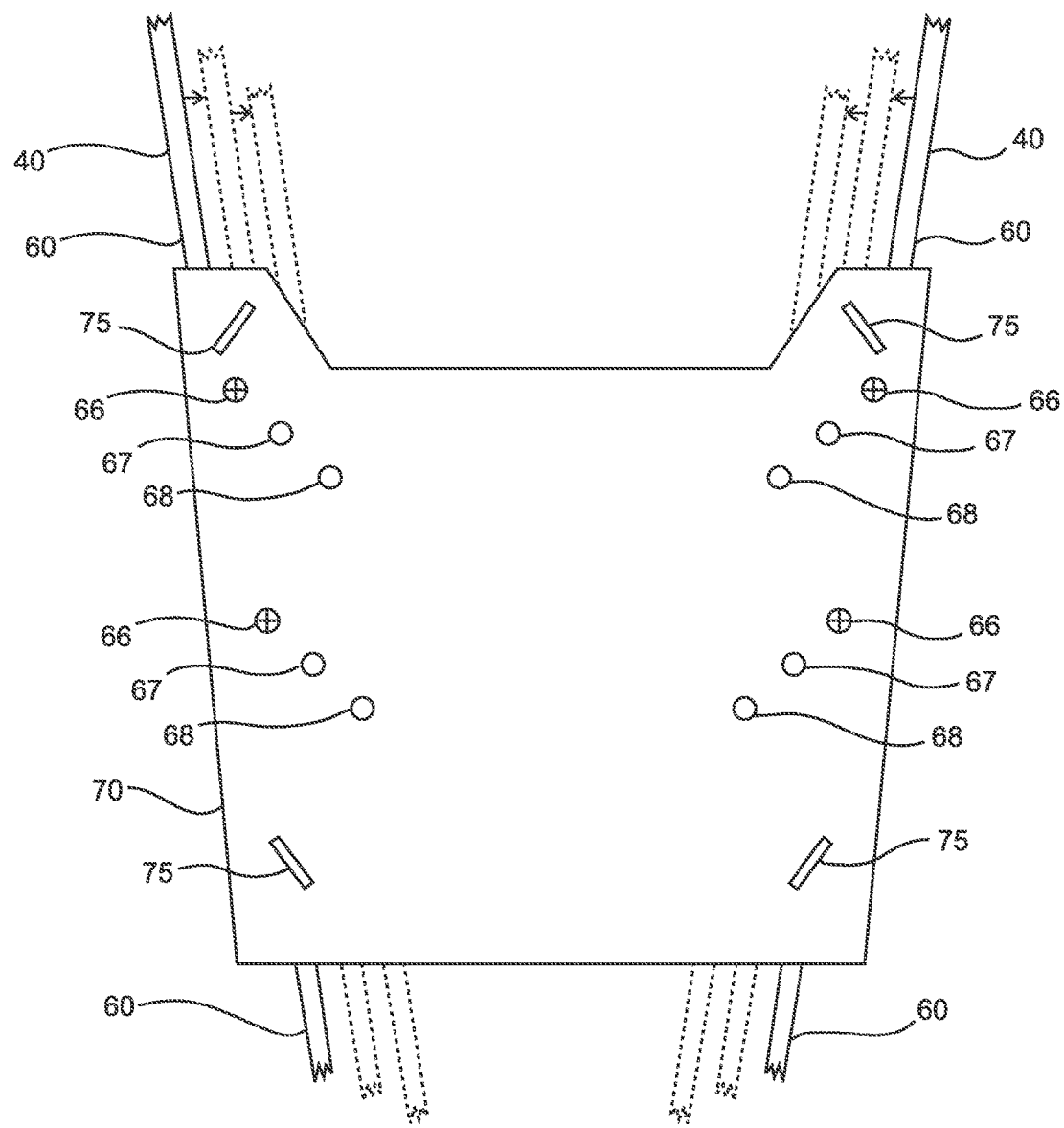
FIG. 9 illustrates a platform of an embodiment of the present invention which includes three positions for mounting the side rails to the platform therefore allowing three different distances between the front ends of the two side rails.

In another embodiment, the platform 70 comprises alternate mounting holes 67, 68 for each of the primary mounting holes 66 as shown in FIG. 9. The alternate mounting holes 67, 68 in platform 70 slant in and back from the primary mounting holes 66 in order to allow adjustment of the distance between the fronts of the side rails and thus accommodate users of wider or narrower bodies between their hips. Alternate mounting holes are drilled into the side rails 60 to correspond with the alternate holes 67, 68 in platform 70. This feature allows the rails to be adjustable over a range of distances between the front ends of the two side rails. These distances can vary by as little as about ½ inch (for example between about 13 inches and about 13½ inches) or by as much as about 6 inches (for example between 13 inches and 19 inches). For example, the distances may vary by about ½ inch, about 1 inch, about 2 inches, about 3 inches, about 4 inches, about 5 inches, about 6 inches.

Figure 8:
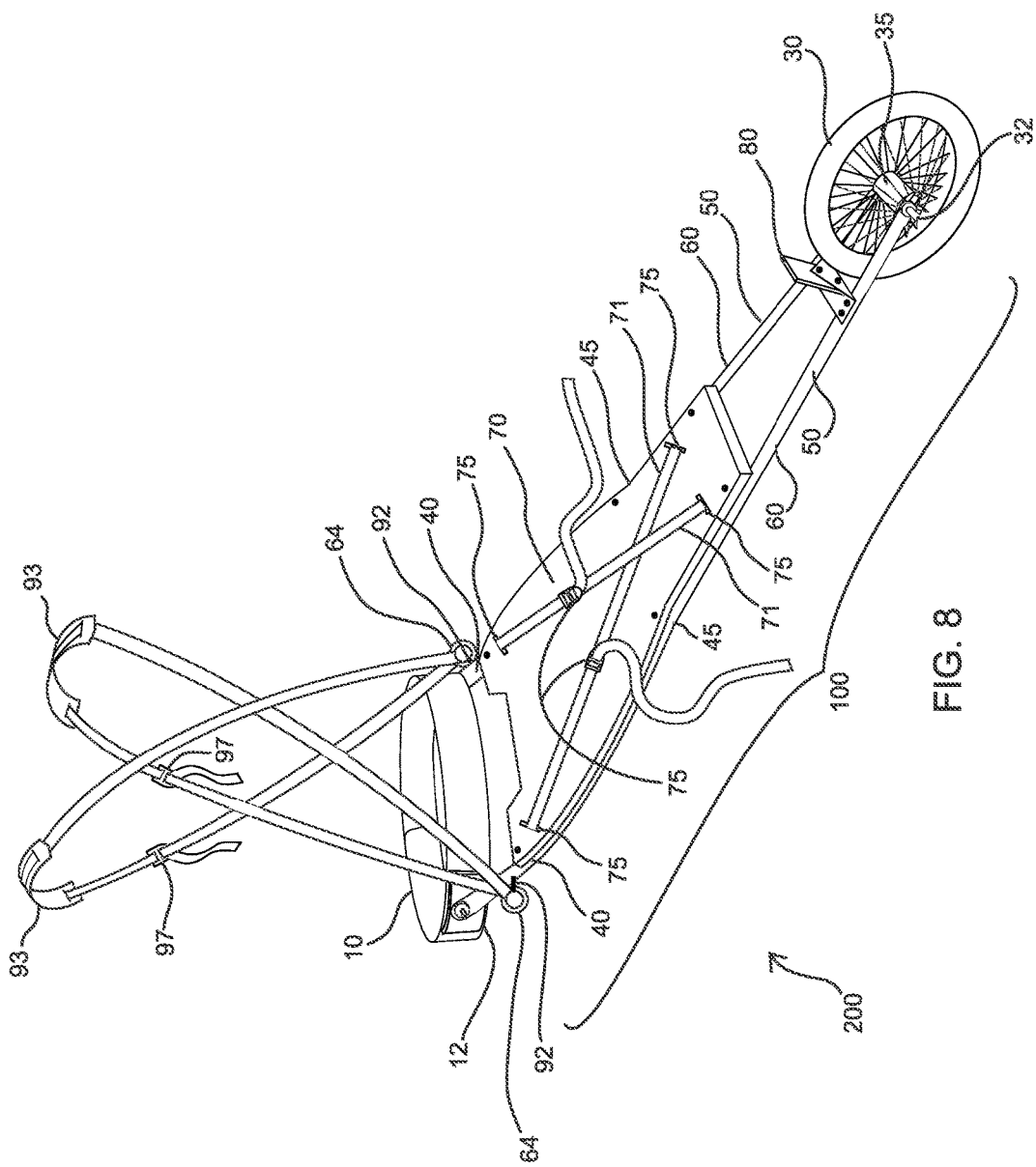
FIG. 8 illustrates an embodiment of a self-adjusting balanced multipurpose transport carrier according to the present invention.

FIG. 9 shows three positions for mounting the side rails to platform 70, therefore allowing three different distances between the front ends of the two side rails. If the rails move to an inner mounting position on the platform, then the shoulder strap attachment rings that are mounted on the rails will also move inward and the shoulder straps now will come up around and rub against the edges of the platform. Therefore, the edges of the platform are smoothed and rounded sufficiently so as not to impede the ability of the strap to slide over them and through the attachment rings or ring mounted to each side rail. In this embodiment, the two mounting holes of the stop plate base (not shown) are slotted such that the stop plate mounting bolts can be loosened, slide left or right, and be retightened which allows the side rails to mount to the stop plate at any of the different side rail positions beneath platform 70. Users of different lateral waist diameters may adjust the distance between the two front ends of the side rails by removing the four mounting bolts 66 on platform 70 and loosening but not removing the two mounting bolts on the stop plate base. User then reinserts and tightens platform 70 bolts in the desired four alternate mounting holes 67 or 68 respectively, on platform 70. Last, user tightens down the two stop plate mounting bolts in the position to which they have slid in relation to the platform adjustment. These adjustments will result in increasing or decreasing the distance between the two side rails. The embodiment in FIG. 8 shows two alternative mounting holes 67, 68 which allow the rails in this embodiment to be adjustable to two alternative positions. One of ordinary skill in the art would recognize that additional embodiments may include the addition of more than three alternative positions, in certain aspects, four, five, six, seven or more alternative positions by adding additional alternative mounting holes.

In certain embodiments, the carrier may include a pair of retractable legs located on the front end of the carrier which keeps the waist belt off the ground when the carrier is stopped and lowered to the ground. These retractable legs would be positioned at the front end of side rails of the frame. One leg would be positioned at the front end of the first side rail and the second leg would be positioned at the front end of the second side rail. When stopping after towing the device, the user would extend the pair of retractable legs and place the carrier on the ground such that the legs are holding up the front end of the carrier and keeping the waist belt off the ground. As such, the retractable legs may serve a kickstand function for the carrier of the present invention.

In certain embodiments, the carrier may also include a set of handles that extend from the front ends of the side rails to allow the user an additional means of balancing the load. In a specific embodiment, the pair of retractable legs functions as handles. In another aspect of the invention, the carrier may include a brake for the mono-wheel. This feature of this embodiment would add safety as the user tows the load, especially a heavy load, down-hill. One of ordinary skill in the art would recognize the materials and methods for adding a brake to the carriers of the present invention. In some embodiments, the far-forward attachment points for shoulder straps could fall in the area where the kickstand retracts up against the front end of the side rail. In order to retain kickstand retractability, the far-forward attachment ring or other hardware would be positioned on or near the topside of the side rail, and/or the kickstand would be notched such that it would avoid bumping into the far-forward attachment ring or other hardware when moved into the "wheels up" position.

The materials used to manufacture the carrier of the present invention would be clear to one of ordinary skill in the art. The size, shape, and positioning or arrangement of the various frame parts, pivot points and the like can vary within the spirit and scope of the present invention as evident to those having ordinary skill in the art.

In an exemplary embodiment, the carrier is constructed in three main sections and of materials that are known to one of ordinary skill in the art and in certain aspects may be obtained from common hardware stores and certain other retail stores. Several variably sized standard nuts and bolts, flat washers, and lock washers (e.g., split lock washers) may be used and made of material known to one of ordinary skill in the art such as stainless steel.

The three main sections are the user harness, frame, and mono-wheel. The largest component of the user harness is a padded waist belt such as the waist belt (only) of an external-frame backpack or a padded work belt. The belt is equipped with a closing web strap attached to a quick-release buckle with a ladder lock for adjusting tightness of the closing strap in accommodating users of different waist sizes. The other major component of the user harness is two hitch mechanisms on either side of the harness where the frame attaches to the user harness. Each hitch mechanism has a rigid gently curved hitch base of steel or plastic (e.g., ABS or PVC), a pad cut to and slightly larger than the hitch base (e.g., cut from a commercially available, foam rubber yoga mat), and a hitch pivot. Five relatively small holes are drilled into the hitch base, and four such holes are formed in the pad with an awl—one in each corner (base and pad) and one in the center (base only). Then four marks are mapped onto each exterior side of the belt through the corner mounting holes on the hitch base, and the belt is rigorously pierced through at these marks with an awl. The marks on the usually black, nylon belt can be made with a white wax pencil such as a Sharpie white peel-off China marker.

The hitch pivot, which can be a steel or in certain aspects, stainless steel shoulder bolt with a smooth shank and threaded end that is neither too short or too long (e.g., 1 inch for shank and threads), is then inserted through the center hole of the hitch base, which is fastened along with the pad to the harness belt at the four mounting holes with suitable, short stainless steel fasteners such as ¾ inch long, #8 round-head bolts, #8 nuts, and matching flat and split lock washers. One of ordinary skill in the art will recognize that these sizes and means for fastening may be interchanged with those well known in the art. The round bolt heads and flat washers are put to the inner side of the belt. These operations are applied identically in mounting both hitch mechanisms to the user harness belt.

The frame comprises side rails, a carrying platform, two shoulder straps, a stop plate, and two retractable kick stands. The side rails can be cut to length (generally ranging from 4 to 5 feet) with a hack saw or more easily with a cutter such as a Ridgid #15 Tubing Cutter from a long piece of ¾ inch (inner diameter) galvanized steel conduit; the rails could also be made of any of a number of other suitably rigid materials including rigid aluminum tubing and carbon fiber. Each metal, tubular side rail of the preferred embodiment is bent inward a few degrees with a pipe bender, such as a ¾ inch Klein Tools conduit bender, such that a gentle curve is formed at approximately the midpoint of the side rail. Then each side rail is drilled out all the way through with a series of relatively small-diameter holes including two sets of vertically oriented, top-to-bottom holes for mounting the platform and one set of vertically oriented, top-to-bottom holes for mounting the stop plate. The platform mounting holes are located in positions to allow ample space for the carrier to pivot up and down on uneven terrain without bringing the platform into contact with the back side of the user.

Each rail is also drilled out all the way through with three sets of horizontally oriented, side-to-side holes, two for mounting the shoulder-strap attachment rings and one for mounting a retractable kick stand. All holes for mounting shoulder straps are filed smooth at the edges so as not to cut zip ties that may be used to fasten the attachment rings to the rail. The rails are then flattened vertically at each end by use of a vice. Each flattened rear end is drilled out with a relatively large hole, and each flattened front end is drilled out with a relatively small hole. All mounting holes are drilled into the rails with a diameter that will allow the selected mounting bolts (or other apparatus) to slide through the holes easily but not too loosely. Now the rails are laid out with curves inward and side by side on a flat surface in a V shape such that the two holes on the insides of the vertically flattened front ends are about 13½ inches apart and such that the two holes on the insides of the vertically flattened rear ends are about 3 to 3½ inches apart.

Next, a piece of rigid material (e.g., ½-inch plywood) is slid underneath the side rails such that it extends beyond the outside of each rail and beyond the front and rear mounting holes. The relatively large trapezoidal shape of the platform is then traced out on the underside of the platform using the outside of each rail as a guide and tracing the pattern out to a few inches forward of the front mounting holes and several inches rearward of the rear mounting holes. The overall platform length can be about 24 inches. Next the positions of the mounting holes in the rails are marked on the platform material such that the front end of the platform is a few inches beyond the front mounting holes and the rear end of the platform is several inches behind the rear mounting holes. Now the platform is cut out of the platform material, including an indent cut into the front end of the platform with an electric jig saw to ensure space for the carrier to pivot up and down without hitting the back side of the user's body.

Next, a small pilot hole is drilled at the center of each mounting point to mark the spot on the upper side where the larger, actual mounting hole is drilled down from the top to make a cleaner hole on the visible, top side. The four holes are drilled with a diameter that will allow the selected mounting bolts to slide through the holes easily but not too loosely. The platform is then marked for short slots near each corner where load tie-down straps can be threaded through the platform. These slot marks slant inward such that the two slots at the opposite ends of each diagonal will face each other after the slots are cut out, such as with a variable-speed dremel rotary tool equipped with a ⅛-inch shank high-speed multipurpose cutting bit. Last, a notch is cut with a jig saw inward from the edge of either side of the platform and this notch is large enough to allow a bicycle lock such as a chain, cable or u-shaped lock to pass through it.

Now a rigid piece of stop plate material (e.g., ½-inch plywood) is slid under the rear section of the two rails such that the material extends beyond the outside of each rail and forward and aft of the stop plate mounting hole on each rail. The relatively small trapezoidal shape of the base of the stop plate is then traced out on the underside of the base using the outside of each rail as a guide and tracing the pattern out to a few inches on either side of the mounting holes, leaving sufficient space from the back end of the stop plate to allow free rotation of the mono-wheel when it is mounted to the frame. The overall length of the stop plate base can be quite short, or just long enough to allow for attaching a strong vertical member such as a small, L-shaped shelf bracket that will stop the load from sliding down on the mono-wheel.

Next the positions of the two mounting holes in the rails are marked on the base of the stop plate. Then the base is cut out of the stop plate material with a saw. Next, a small pilot hole is drilled at the center of each mounting point to mark the spot on the upper side where the larger, actual mounting hole is drilled down from the top of the stop plate base to make a cleaner hole on the visible, top side. The two holes are drilled with a diameter that will allow the selected mounting bolts to slide through them easily but not too loosely. The vertical member is then attached via nuts and short, small bolts to the stop plate base.

Now side rail and platform components of the frame are assembled. The platform is positioned correctly over the topside of the two rails. A relatively narrow-diameter (e.g., #8) round-head bolt is threaded first through the bottom hole of each of the four sets of platform mounting holes in the rails and pushed through the upper mounting hole, the platform surface, a flat washer, lock washer, and nut, which is tightened down. The ends of the four platform mounting bolts are flush with or showing no more than a couple of threads above the top of the tightened nut. The round heads of the four mounting bolts are on the bottom side of the side rails so that the carrier can slide easily over obstacles such as logs tall enough to make contact with the underside of the carrier. The shoulder strap mounts are made of a suitably sized steel o-ring and a zip tie. The zip tie is threaded through the rail from the inside hole of each of the four sets of shoulder strap mounting holes, through the steel o-ring, back through the same holes, and through its lock on the inside of the rail; the zip tie is pulled tight, clamping the steel o-ring snugly to the outside of the side rail.

For the retractable legs, or kickstands, two lengths (e.g., ranging from 8-10 inches each) are cut from 1-inch (internal diameter) PVC pipe. A slot is then marked out over the full length of each PVC pipe such that the slot is narrower at each end and wider along most of the length of the pipe. The slots are then cut out such as with a variable-speed dremel rotary tool equipped with a cutting wheel. The narrower slot at one end forms two mounting tabs on either side of the pipe, both of which are drilled out with a relatively small-diameter hole. The narrower slot at the foot end of the kickstand creates two tabs that will snug up against the tubular side rail and allow the stand to nest over the side rail when it is retracted. Each kickstand is then positioned correctly on its side rail, with the mounting tabs snapping onto and over the inner and outer mounting holes in the rail. A relatively small-diameter, sufficiently long shoulder bolt is inserted through a flat washer, through the inner mounting hole in the kickstand, through the diameter of the side rail, through the outer mounting hole of the stand, and through a flat washer against the outer side of the stand with just enough shank protruding from the outer side of the assembly to apply a flat washer over the shank and tightened lock nut such as a zinc-plated nylon lock nut to the threaded end.

Two relatively long shoulder straps are made of medium-wide (e.g., 1-inch) web strapping and are equipped with any of a number of types of shoulder pad (such as a Timbuk2 D-Lux strap pad) and a ladderlock buckle at one end. These straps are long enough to slip easily over the user's head when they are closed and the user is attached to the carrier via the harness belt. Each shoulder strap is one long web strap that slides through its attachment rings or ring on the side rail before closing into a continuous loop via the ladderlock buckle in front. Each shoulder strap, however, also could be two, shorter lengths of web strap that connect to each other in front via the ladderlock buckle and connect at the other ends to the attachment rings or ring on the side rail by any of several different types of suitable fasteners such as plastic/nylon or metal swivel snap hooks. Two load-securing tie-down straps are made of relatively long but narrower (e.g., ¾-inch) web strapping and equipped with a suitably sized ladderlock buckle at one end. These straps are long enough to close and tighten down over a substantially sized load on the top of the platform. A small bicycle wheel is procured from a bicycle shop.

Now it is time to assemble together the user harness, frame, and mono-wheel. First, the user harness is positioned at the front ends of the side rails such that each of the two hitch pivot shoulder bolts can be inserted through a flat washer, the inner and outer mounting holes on the side rails, and through a flat washer on the shank and a lock nut that is tightened down on the threaded end of the bolt. Then the mono-wheel is positioned at the rear end of the side rails such that its axle bolts can be inserted through a flat washer and the mounting hole on the end of each rail. It likely will be necessary to spread the ends of the rails, which will act like springs, to allow enough space to insert the axle bolts. This spreading and spring action are possible because the stop plate has not yet been mounted to the side rails close to the mono-wheel mounts. Then the locking nut of the mono-wheel axle is tightened down on each axle bolt.

Now the previously assembled stop plate (base and vertical member) is positioned correctly over the topside and toward the rear of the two rails. Again, a relatively narrow-diameter (e.g., #8) round-head bolt is threaded first through the bottom hole of each of the two sets of stop plate mounting holes in the rails and pushed through the upper mounting hole, the base surface, a flat washer, lock washer, and nut, which is tightened down. The ends of the two stop plate mounting bolts are flush with or showing no more than a couple of threads above the top of the tightened nut. Again, the round heads of the mounting bolts are on the bottom side of the side rails so that the carrier can slide easily over obstacles such as logs tall enough to make contact with the underside of the carrier.

Now the shoulder straps with shoulder pads can be threaded through the two sets of o-rings on each side rail and closed by inserting the free end through the ladderlock buckle end; each shoulder pad rests just behind the ladder lock buckles, which should be oriented such that the loose strap end extends down from the buckle when it is properly positioned over the chest of the user. Last, each of the two tie-down straps is threaded down through one corner slot of the platform, across the underside, and up through the diagonally opposite corner slot of the platform, making a continuous loop when the loose end is threaded through the ladderlock buckle and tightened down over a load on the topside of the platform. As evident to those having ordinary skill in the art, the size, length, shape, materials and positioning or arrangement of the various frame parts, pivot points, and the like can vary within the spirit and scope of the present invention. The interchangeability of materials used to manufacture carriers of the present invention are evident to one of ordinary skill in the art.

The embodiments of the present invention provide a transport carrier requiring minimal materials in accomplishing its balance and efficiency in towing substantial loads which in turn, allows the transport carrier to stay as light as possible without adding additional weight as a result of more complexity and more structural components. While allowing for a lighter device constructed of less material, the elegant simplicity of the present invention does not compromise strength or function and has a planar (two-dimensional) carrying platform which accommodates loads with great flexibility in design, configuration and weight. The present invention comprises laterally spaced side rails, which unaided can slide easily over obstacles including rocks and downed tree trunks (without the need of removing the mono-wheel) and which unaided keep the carrier upright when it sits or is loaded and unloaded on the ground.

The unibody construction of the present invention is simple, sturdy and easily balanced via its crisscross shoulder straps. An inherent problem with a mono-wheel carrier is balance under a heavy load, which is virtually never adequately balanced over the carrier's longitudinal (front/back) axis. Whereas two wheels on an axle or axis between them can catch shifting weight, one wheel cannot. This problem has been solved in the present invention via hands-free self-adjusting shoulder straps designed specifically to exert balancing force on the mono-wheel carrier body, as well as via several features conferring rigidity to the carrier unibody. These shoulder straps are a unique method for allowing hands-free towing.

Methods

As summarized above, the present invention includes methods of using the self-adjusting balanced multipurpose transport carriers for carrying a balanced load. For example, a user may use the transport carrier shown in FIG. 1 to carry a balanced load. A user would first secure a load to the carrier by placing the load on the platform 70 of the frame 100 in a manner such that the load is situated as low to the platform 70 and far back as possible, thus lowering the center of gravity and maximizing weight on the mono-wheel 30 and off the user's waist; the load is also resting against the stop plate 80. A user may use the load-securing straps 71 to stabilize the load on the platform 70. Additional load-securing straps with adjustment buckles and pull-strap extensions may be necessary, and they may run laterally across the top of the load and under side rails to further secure loads of varying sizes and shapes if needed. Other load-securing options could include resilient web or open mesh fabric such as nylon that is attached to and spans platform 70.

User next would back up to the front end of the carrier and open harness belt 10 lying on or near the ground. User would then lift the front ends of the side rails 60 such that the unbuckled, loosely fitting harness belt 10 is brought up to and around user's waist. Next, user secures the harness belt 10 around user's waist in a comfortably snug fashion by use of the adjustment pull-straps extending from the ladder-lock latch and or from the ladder-lock body of the quick-release buckle 11 (as shown in FIG. 2B). In some embodiments, the device is resting on two-retractable kickstands positioned at the front ends of side rails. User in this aspect would grab the kickstands to lift the load in a manner similar to grabbing handles. As the weight of the load is resting primarily on the mono-wheel 30, this step does not add any load burden to the user.

The tightened harness belt 10 is generally capable of steadying an evenly distributed load at a standstill, allowing the user now to put on the crisscross shoulder straps 90 (FIG. 4). Each strap 90 passes over the user's head such that its shoulder pad 93 is resting on the shoulder opposite of the side where the strap is attached to the side rail 60. For example, user would put the shoulder strap 90 attached to the left side rail 60 over the user's head so that this strap's shoulder pad 93 rests on user's right shoulder when facing forward from the front end of the towing device. In turn, user would take the shoulder strap 90 attached to the right side rail 60 and pull it over the user's head so that the shoulder pad 93 of this strap rests on the user's left shoulder. User then ensures that the shoulder straps 90 are in mild tension such that an angle is formed between the strap and the front portion of the side rail when user is wearing the crisscross shoulder straps and standing still and not towing the load and wherein the angle ranges from about 10° to about 90°, such as for example from about 30° to about 60°, such as for example from about 15° to about 30°. In a specific embodiment, the angle ranges from about 10° to about 25°.

User would then start walking, as shown in FIG. 7A, and towing the load without feeling burden of weight on user's body as the weight of the load (not shown in FIG. 7A) is resting primarily on the mono-wheel 30. The load tends to wobble left and right on account of the normal, variable motion of walking and towing, and so the carrier becomes unbalanced and starts to tilt to one side or the other. The crisscross shoulder straps 90 prevent appreciable loss of balance because each strap runs directly from the shoulder to the rail 60 on the opposite side of the carrier, where the strap is anchored at two strategically spaced points 92 and 91, creating in effect a triangle with a stabilizing base exerting a powerful lift on the side rail. This arrangement generally maintains balance.

With comfortably tensioned shoulder straps 90, user feels a modest shifting of pull between the left and right shoulder straps as the weighted carrier wobbles pleasantly on either side of the equilibrium point, continually bringing itself back into equilibrium, or self-righting, without the need of user's hands. If the carrier should begin to lose balance significantly, however, the shoulder straps catch the shift in weight well before it reaches a critical stage of unbalance. A small forward movement of the shoulder opposite to the direction of roll, for example moving the left shoulder in the case of a right-rolling load, quickly and easily rights the carrier without affecting the balance of the user. If more than a shoulder twitch is needed, user can lightly tighten or tug on the shoulder strap opposite to the direction of roll to help bring the carrier back into an upright or vertical position. The shoulder straps 90 have easily reached ladder lock buckles 97 and pull straps 98 in front for this occasionally needed purpose.

When user wants to turn or adjust direction of travel or even take a sharp turn, whether from a stop or while walking, user simply turns in the wanted direction and the carrier will follow in the same direction. The carrier effectively shadows the user, following directly behind under almost any wilderness conditions or terrain. As the crisscross shoulder straps are sustaining balance of the load, these turns and maneuvers do not add load burden to the user as the mono-wheel is carrying the burden. Sharp turns are easily accomplished with the carrier by user loosening the harness belt via the ladderlock buckle and turning or rotating the user's body within the belt. The user's waist readily slides within the belt. As the user walks and straightens out in the new direction, the belt slides back along the waist to the proper, frontward orientation. User then simply retightens the harness belt via the ladderock buckle.

The transport carrier of the present invention is capable of sustaining a balanced load with its weight resting primarily on the mono-wheel to reduce the load burden on the user while at the same time providing maneuverability when traveling substantial distances, in particular over varying rough terrains. Accordingly, the embodiments may be used by hikers and campers to tow their supplies and gear over a substantial distance.

It is readily apparent to one of ordinary skill in the art that the transport carriers may be used for other purposes besides hiking and camping. For example, the ability for a user to be able to transport a heavy load burden by foot would be useful for many different purposes including military purposes, parks and recreation, farming, police services and fire services to name a few. In addition, a user living in an urban setting may not have ready access to a vehicle or public transportation and may wish to use the transport carrier of the present invention to tow items such as groceries, bulky dry goods, laundry, books etcetera.

EXAMPLES

To investigate the balancing element of the present invention, we compared the transport carrier comprising crisscross shoulder straps as described in the present invention against a transport carrier comprising parallel shoulder straps in a standard backpack configuration.

Example 1: Distance Over a Relatively Smooth, Flat Surface

A load of 50 lbs. was added to the transport carrier of the present invention comprising crisscross shoulder straps. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 50 lbs. load for 1 mile.

A load of 50 lbs. was added to a transport carrier comprising parallel shoulder straps in a standard backpack configuration. User put on the harness belt and the parallel shoulder straps in a standard backpack configuration. User proceeded to attempt to tow the 50 lbs. load for 1 mile.

Results:

The load on the transport carrier of the present invention comprising crisscross shoulder straps remained balance for the entire 1 mile distance. The majority of the weight of the load remained on top of the mono-wheel so that the mono-wheel carried the majority of the load burden. The user did not feel any burden of the 50 lbs. load for the entire 1 mile distance.

The load on the transport carrier comprising parallel shoulder straps in a standard backpack configuration started to unbalance within the first 10 feet of the 1 mile distance. The further the user traveled, the more unbalanced the load became which resulted in the load weight shifting off of the mono-wheel and rolling from one side to the other which puts the weight predominantly over the ground and requires the harness belt in front to catch the weight no longer resting on the mono-wheel. The user now felt a substantial part of the load burden on the body as pressure mounted on the harness belt. This weight on the user's body through the harness belt was doubly uncomfortable because it was unbalanced, pushing down on the side of the roll and up on the side away from the roll. If the load were to roll all the way over, towing the unbalanced carrier would become like pulling an ungainly, dragging sled.

Example 2: Distance Up a Hill Having an Incline of 20°

A load of 50 lbs. was added to the transport carrier of the present invention comprising crisscross shoulder straps. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 50 lbs. load up a hill having an incline of 20°.

A load of 50 lbs. was added to a transport carrier comprising parallel shoulder straps in a standard backpack configuration. User put on the harness belt and the parallel shoulder straps in a standard backpack configuration. User proceeded to attempt to tow the 50 lbs. load up a hill having an incline of 20°.

Results:

The load on the transport carrier of the present invention comprising crisscross shoulder straps remained balanced as it was towed up the hill having an incline of 20°. The majority of the weight of the load remained on the mono-wheel so that the mono-wheel carried the majority of the load burden. At certain instances as a result of the incline, rough terrain, and normal motions of walking, the load shifted but the crisscross shoulder straps caught the shift in weight and allowed the carrier to self-adjust. When the load rolled to the right, the strap on the left shoulder tightened and the load rebalanced automatically while the user proceeded up the hill. When the load rolled to the left, the strap on the right shoulder tightened and the load rebalanced automatically while the user proceeded up the hill.

The load on the transport carrier comprising parallel shoulder straps in a standard backpack configuration started to unbalance as soon as the user proceeded up the hill having an incline of 20°. The parallel straps were incapable of rebalancing the load, and the farther the user traveled, the more unbalanced the load became which resulted in the weight of the load moving off of the mono-wheel and rolling from one side to the other which puts the weight predominantly over the ground and requires the harness belt in front to catch the weight no longer resting on the mono-wheel. The user now felt a substantial part of the load burden on the body as pressure mounted on the harness belt. This weight on the user's body through the harness belt was doubly uncomfortable because it was unbalanced, pushing down on the side of the roll and up on the side away from the roll. If the load were to roll all the way over, towing the carrier would become like pulling an ungainly, dragging sled Example 3: Distance Up a Hill Having an Incline of 45°

A load of 50 lbs. was added to the transport carrier of the present invention comprising crisscross shoulder straps. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 50 lbs. load up a hill having an incline of 45°.

A load of 50 lbs. was added to a transport carrier comprising parallel shoulder straps in a standard backpack configuration. User put on the harness belt and the parallel shoulder straps in a standard backpack configuration. User proceeded to attempt to tow the 50 lbs. load up a hill having an incline of 45°.
Results:

The load on the transport carrier of the present invention comprising crisscross shoulder straps remained balance up the hill having an incline of 45°. The majority of the weight of the load remained on the mono-wheel so that the mono-wheel carried the majority of the load burden. At certain instances as a result of the incline, the load shifted but the crisscross shoulder straps caught the shift in weight and allowed the carrier to self-adjust. When the load rolled to the right, the strap on the left shoulder tightened and the load rebalanced automatically while the user proceeded up the hill. When the load rolled to the left, the strap on the right shoulder tightened and the load rebalanced automatically while the user proceeded up the hill.

The load on the transport carrier comprising parallel shoulder straps in a standard backpack configuration started to unbalance as soon as the user proceeded up the hill having an incline of 45°. The parallel straps were incapable of rebalancing the load, which became so unbalanced that the user had to stop and could not complete the climb up this steep hill.

Example 4: Distance Over Rocky Terrain with Deep Ruts and Holes

A load of 50 lbs. was added to the transport carrier of the present invention comprising crisscross shoulder straps. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 50 lbs. load over rocky terrain with deep ruts and holes for approximately 50 feet.

A load of 50 lbs. was added to a transport carrier comprising parallel shoulder straps in a standard backpack configuration. User put on the harness belt and the parallel shoulder straps in a standard backpack configuration. User proceeded to attempt to tow the 50 lbs. load over rocky terrain with deep ruts and holes for approximately 50 feet.
Results:

The load on the transport carrier of the present invention comprising crisscross shoulder straps remained balance over rocky terrain with deep ruts and holes for approximately 50 feet. A great majority of the weight of the load remained on the mono-wheel so that the mono-wheel carried the majority of the load burden. At certain instances as a result of the rocks, ruts and holes, the load shifted but the crisscross shoulder straps caught the shift in weight and allowed the carrier to self-adjust. When the load rolled to the right, the strap on the left shoulder tightened and the load rebalanced automatically while the user proceeded up the hill. When the load rolled to the left, the strap on the right shoulder tightened and the load rebalanced automatically while the user proceeded up the hill.

The load on the transport carrier comprising parallel shoulder straps in a standard backpack configuration started to unbalance as soon as the user proceeded over the rocky terrain with deep ruts and holes. The parallel straps were incapable of rebalancing the load, which became so unbalanced that the user had to stop and could not complete the distance.

Example 5: Distance Over Smooth, Flat Surface with 65 Lbs

A load of 65 lbs. was added to the transport carrier of the present invention comprising crisscross shoulder straps. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 65 lbs. load over a smooth, flat surface for approximately 250 feet.

A load of 65 lbs. was added to a transport carrier comprising parallel shoulder straps in a standard backpack configuration. User put on the harness belt and the parallel shoulder straps in a standard backpack configuration. User proceeded to attempt to tow the 65 lbs. load over a smooth, flat surface for approximately 250 feet.
Results:

The 65 lbs. load on the transport carrier of the present invention comprising crisscross shoulder straps remained balanced for the entire distance. The majority of the weight of the load remained on the mono-wheel so that the mono-wheel carried the majority of the load burden. The user did not feel any burden of the 65 lbs. load for the entire distance. The majority of the load remained on top of the mono-wheel so that the mono-wheel carried the majority of the load burden. At certain instances, the load shifted but the crisscross shoulder straps caught the shift in weight and allowed the carrier to self-adjust. When the load rolled to the right, the strap on the left shoulder tightened and the load rebalanced automatically while the user continued to tow the load. When the load rolled to the left, the strap on the right shoulder tightened and the load rebalanced automatically while the user continued to tow the load.

The 65 lbs. load on the transport carrier comprising parallel shoulder straps in a standard backpack configuration started to unbalance within the first few feet. The parallel straps were incapable of rebalancing the load, and the farther the user traveled, the more unbalanced the load, which resulted in the weight of the load moving off of the mono-wheel and over the ground, or rolling from one side to the other. This uncorrectable shift in weight resulted in the user feeling a substantial part of the load burden as the weight falling off of the mono-wheel was caught by the harness belt which caused the carrier to begin behaving more like a dragging sled than a wheeled vehicle.

Example 6: Distance Over Smooth, Flat Surface with 75 Lbs

A load of 75 lbs. was added to the transport carrier of the present invention comprising crisscross shoulder straps.

User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 75 lbs. load over a smooth, flat surface for approximately 250 feet.

A load of 75 lbs. was added to a transport carrier comprising parallel shoulder straps in a standard backpack configuration. User put on the harness belt and the parallel shoulder straps in a standard backpack configuration. User proceeded to attempt to tow the 75 lbs. load over a smooth, flat surface for approximately 250 feet.

Results:

The 75 lbs. load on the transport carrier of the present invention comprising crisscross shoulder straps remained balanced for the entire distance. The majority of the weight of the load remained on the mono-wheel so that the mono-wheel carried the majority of the load burden. At certain instances, the load shifted but the crisscross shoulder straps caught the shift in weight and allowed the carrier to self-adjust. When the load rolled to the right, the strap on the left shoulder tightened and the load rebalanced automatically while the user proceeded the distance. When the load rolled to the left, the strap on the right shoulder tightened and the load rebalanced automatically while the user proceeded to tow the load.

The load on the transport carrier comprising parallel shoulder straps in a standard backpack configuration started to unbalance within the first few feet. The parallel straps were incapable of rebalancing the load, which became so unbalanced that the user had to stop and could not complete the distance.

Example 7: Distance Over Smooth, Flat Surface with 100 Lbs

A load of 100 lbs. was added to the transport carrier of the present invention comprising crisscross shoulder straps. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User ensured that the first and second shoulder straps and the front end portion of the first and second side rails form angles ranging from 15°-30° between the strap and the front portion of the side rail, respectively, when a user is wearing the crisscross shoulder straps and standing still and not towing the load. User proceeded to tow the 100 lbs. load over a smooth, flat surface for approximately 250 feet.

A load of 100 lbs. was added to a transport carrier comprising parallel shoulder straps in a standard backpack configuration. User put on the harness belt and the parallel shoulder straps in a standard backpack configuration. User proceeded to attempt to tow the 100 lbs. load over a smooth, flat surface for approximately 250 feet.

Results:

The 100 lbs. load on the transport carrier of the present invention comprising crisscross shoulder straps remained balanced for the entire distance. The majority of the weight of the load remained on the mono-wheel so that the mono-wheel carried the majority of the load burden. At certain instances, the load shifted but the crisscross shoulder straps caught the shift in weight and allowed the carrier to self-adjust. When the load rolled to the right, the strap on the left shoulder tightened and the load rebalanced automatically while the user continued towing the load. When the load rolled to the left, the strap on the right shoulder tightened and the load rebalanced automatically while the user continued towing the load.

The load on the transport carrier comprising parallel shoulder straps in a standard backpack configuration started to unbalance within the first few feet. The parallel straps were incapable of rebalancing the load, which became so unbalanced that the user had to stop and could not complete the distance.

Example 8: Embodiment with Shoulder Straps Attached to Side Rails at a Single Point of Attachment and Distance Over Smooth, Flat Surface with 100 Lbs A load of 100 lbs. was added to the transport carrier of the present invention comprising crisscross shoulder straps comprising a first strap attached to the first side rail at a single point of attachment located at the front end area of the first side rail and the second point of attachment located at the front end area of the second side rail. User put on the harness belt of the present invention and the crisscross shoulder straps as shown in FIG. 4, such that shoulder straps 90 cross and pass over user's head such that first strap 90 fits over user's right shoulder and second strap 90 fits over user's left shoulder. User proceeded to tow the 100 lbs. load over a smooth, flat surface for approximately 1000 feet.

A load of 100 lbs. was added to a transport carrier comprising parallel shoulder straps in a standard backpack configuration. User put on the harness belt and the parallel shoulder straps in a standard backpack configuration. User proceeded to attempt to tow the 100 lbs. load over a smooth, flat surface for approximately 1000 feet.

Results:

The 100 lbs. load on the transport carrier of the present invention comprising crisscross shoulder straps remained balanced for the entire distance of 1000 feet. The majority of the weight of the load remained on the mono-wheel so that the mono-wheel carried the majority of the load burden. At certain instances, the load shifted but the crisscross shoulder straps caught the shift in weight and allowed the carrier to self-adjust. When the load rolled to the right, the strap on the left shoulder tightened and the load rebalanced automatically while the user continued towing the load. When the load rolled to the left, the strap on the right shoulder tightened and the load rebalanced automatically while the user continued towing the load.

The load on the transport carrier comprising parallel shoulder straps in a standard backpack configuration started to unbalance within the first few feet. The parallel straps were incapable of rebalancing the load, which became so unbalanced that the user had to stop and could not complete the distance.

What is claimed is:

1. A self-adjusting balanced transport carrier for carrying a load comprising:
    (a) a harness belt for attaching to a user;
    (b) a mono-wheel;
    (c) a frame comprising a first and second side rail, wherein said first and second side rails comprises a front end, a rear end, and a midpoint;

(d) a platform;

(e) a stop plate; and (f) a pair of crisscross shoulder straps comprising a first strap and a second strap, wherein the first strap is attached to the first side rail at a first point of attachment and a second point of attachment and the second strap is attached to the second side rail at a first point of attachment and a second point of attachment, wherein said crisscross shoulder straps are not attached to the harness belt.

2. The transport carrier of claim 1, wherein the first point of attachment for the first strap is located at the front end of the first side rail and the first point of attachment for the second strap is located at the front end of the second side rail.

3. The transport carrier of claim 1, wherein the second point of attachment for the first strap is located at the front end of the first side rail and the second point of attachment for the second strap is located at the front end of the second side rail.

4. The transport carrier of claim 1, wherein the second point of attachment for the first strap is located adjacent to the first point of attachment and the second point of attachment for the second strap is adjacent to the first point of attachment.

5. The transport carrier of claim 1, wherein the side rails are configured to adjust the position of the first and second point of attachment for the first and second straps.

6. The transport carrier of claim 1, wherein the first strap and first side rail are configured to form an angle between the first strap and the front end of the first side rail when a user is wearing the crisscross shoulder straps and wherein the second strap and the front end of the second side rail are configured to form an angle between the second strap and the second side rail and wherein said angle is sufficient to allow the crisscross shoulder straps to adjust and balance a load.

7. The transport carrier of claim 6, wherein said angle ranges from about 10° to about 90°.

8. The transport carrier of claim 6, wherein said angle ranges from about 30° to about 60°.

9. The transport carrier of claim 6, wherein said angle ranges from about 15° to about 30°.

10. The transport carrier of claim 1, further comprising a pair of retractable legs.

11. The transport carrier of claim 1, further comprising load-securing straps.

12. The transport carrier of claim 1, wherein said side rails, platform and stop plate are configured to adjust the side rails to be closer or farther apart.

13. The transport carrier of claim 1, further comprising a brake mechanism for said mono-wheel.

14. The transport carrier of claim 1, further comprising a pair of handles.

15. A self-adjusting balanced transport carrier for carrying a load comprising:

(a) a harness belt for attaching to a user;

(b) a mono-wheel;

(c) a frame comprising a first and second side rail, wherein said first and second side rails comprises a front end, a rear end, and a midpoint;

(d) a platform;

(e) a stop plate; and (f) a pair of crisscross shoulder straps comprising a first strap and a second strap, wherein the first strap is attached to the first side rail at a first point of attachment and a second point of attachment, and wherein the second strap is attached to the second side rail at a first point of attachment and a second point of attachment, wherein said shoulder straps are configured to directly self-adjust to balance the frame when the frame is unbalanced when transporting the load.

* * * * *